US012771423B2

(12) United States Patent
Anwani et al.

(10) Patent No.: US 12,771,423 B2
(45) Date of Patent: Oct. 20, 2026

(54) BOTTLENECK BAND-BASED CHANNEL STATE ESTIMATION

(71) Applicant: QUALCOMM Incorporated, San Diego, CA (US)

(72) Inventors: Navin Dunichand Anwani, Gondia (IN); Sanaz Barghi, Carlsbad, CA (US); Pouriya Sadeghi, San Diego, CA (US); Weiliang Zeng, San Diego, CA (US); Supratik Bhattacharjee, San Diego, CA (US); Gautham Hariharan, Sunnyvale, CA (US); Alexandre Pierrot, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/683,456

(22) PCT Filed: Oct. 14, 2022

(86) PCT No.: PCT/US2022/046733

§ 371 (c)(1),
(2) Date: Feb. 13, 2024

(87) PCT Pub. No.: WO2023/076047

PCT Pub. Date: May 4, 2023

(65) Prior Publication Data

US 2024/0356606 A1 Oct. 24, 2024

(30) Foreign Application Priority Data

Oct. 31, 2021 (IN) ............................ 202141049914

(51) Int. Cl.

*H04L 1/00* (2006.01)
*H04B 7/0456* (2017.01)
*H04B 7/06* (2006.01)

(52) U.S. Cl.

CPC ......... *H04B 7/0626* (2013.01); *H04B 7/0456* (2013.01); *H04L 1/0026* (2013.01)

(58) Field of Classification Search

CPC ..... H04B 7/626; H04B 7/0456; H04L 1/0026; H04W 36/00; H04W 36/06; H04W 72/04; H04W 76/27; H04W 76/38

See application file for complete search history.

(56) References Cited

U.S. PATENT DOCUMENTS 10,594,380 B1 * 3/2020 Nammi ................ H04B 7/0639
2006/0146717 A1 * 7/2006 Conner ................ H04W 40/16
370/351

(Continued)

OTHER PUBLICATIONS

Chen S., et al., "Learning-Based Remote Channel Inference: Feasibility Analysis and Case Study", IEEE Transactions on Wireless Communications, IEEE Service Center, Piscataway, NJ, US, vol. 18, No. 7, Jul. 1, 2019, pp. 3554-3568, XP011734392, ISSN: 1536-1276, DOI: 10.1109/TWC.2019.2915683, Abstract, Sections I.-III.

(Continued)

*Primary Examiner* — Jamal Javaid
(74) *Attorney, Agent, or Firm* — Qualcomm Incorporated/Seyfarth Shaw LLP

(57) ABSTRACT

A method for wireless communication by a user equipment (UE) includes receiving, from a base station, a reference signal on a wideband channel. The method further includes estimating, at the UE, the wideband channel based on receiving the reference signal. The method still further includes identifying, at the UE, a bottleneck band of the wideband channel based on a metric associated with the estimated wideband channel. The method also includes transmitting, to the base station, a channel state feedback report based on identifying the bottleneck band, the channel state feedback report indicating channel state information (Continued)

(CSI) associated with the estimated wideband channel. The method further includes receiving, from the base station, a transmission grant based on transmitting the channel feedback report.

26 Claims, 13 Drawing Sheets

(56) References Cited

U.S. PATENT DOCUMENTS

| | | | |
|---|---|---|---|
| 2016/0065274 | A1 | 3/2016 | Kim et al. |
| 2020/0052751 | A1 | 2/2020 | Nammi |

OTHER PUBLICATIONS

International Search Report and Written Opinion—PCT/US2022/046733—ISA/EPO—Feb. 3, 2023.

* cited by examiner

BOTTLENECK BAND-BASED CHANNEL STATE ESTIMATION

CROSS-REFERENCE TO RELATED APPLICATION

The present application claims priority to Indian Application No. 202141049914, filed on Oct. 31, 2021, and titled “BOTTLENECK BAND-BASED CHANNEL STATE ESTIMATION,” the disclosure of which is expressly incorporated by reference in its entirety.

FIELD OF THE DISCLOSURE

Aspects of the present disclosure generally relate to wireless communications, and more particularly to identifying a bottleneck band and estimating channel state information based on the bottleneck band.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

In some conventional wireless communication systems, a base station may transmit a reference signal (RS), such as a channel state information (CSI) RS (CSI-RS), to a user equipment (UE) and receive a channel state feedback (CSF) report, such as a CSI report, from the UE, based on measurements of the reference signal. The CSF report provides information about a channel between the base station and the UE. In such conventional wireless communication systems, the CSF report may be an implicit report, such as a Type I report or Type II report, or an explicit report, such as a report indicating channel coefficients.

SUMMARY

In one aspect of the present disclosure, a method for wireless communication by a user equipment (UE) includes receiving, from a base station, a reference signal on a wideband channel. The method further includes estimating, at the UE, the wideband channel based on receiving the reference signal. The method still further includes identifying, at the UE, a bottleneck band of the wideband channel based on a metric associated with the estimated wideband channel. The method also includes transmitting, to the base station, a channel state feedback report based on identifying the bottleneck band, the channel state feedback report indicating channel state information (CSI) associated with the estimated wideband channel. The method further includes receiving, from the base station, a transmission grant based on transmitting the channel feedback report.

Another aspect of the present disclosure is directed to an apparatus including means for receiving, from a base station, a reference signal on a wideband channel. The apparatus further includes means for estimating, at the UE, the wideband channel based on receiving the reference signal. The apparatus still further includes means for identifying, at the UE, a bottleneck band of the wideband channel based on a metric associated with the estimated wideband channel. The apparatus also includes means for transmitting, to the base station, a channel state feedback report based on identifying the bottleneck band, the channel state feedback report indicating CSI associated with the estimated wideband channel. The apparatus further includes means for receiving, from the base station, a transmission grant based on transmitting the channel feedback report.

In another aspect of the present disclosure, a non-transitory computer-readable medium with non-transitory program code recorded thereon is disclosed. The program code is executed by a processor and includes program code to receive, from a base station, a reference signal on a wideband channel. The program code further includes program code to estimate, at the UE, the wideband channel based on receiving the reference signal. The program code still further includes program code to identify, at the UE, a bottleneck band of the wideband channel based on a metric associated with the estimated wideband channel. The program code also includes program code to transmit, to the base station, a channel state feedback report based on identifying the bottleneck band, the channel state feedback report indicating CSI associated with the estimated wideband channel. The program code further includes program code to receive, from the base station, a transmission grant based on transmitting the channel feedback report.

Another aspect of the present disclosure is directed to an apparatus for wireless communications at a UE, the apparatus includes a processor, a memory coupled with the processor, and instructions stored in the memory and operable, when executed by the processor, to cause the apparatus to receive, from a base station, a reference signal on a wideband channel. Execution of the instructions also cause the apparatus to estimate the wideband channel based on receiving the reference signal. Execution of the instructions further cause the apparatus to identify, at the UE, a bottleneck band of the wideband channel based on a metric associated with the estimated wideband channel. Execution of the instructions still further cause the apparatus to transmit, to the base station, a channel state feedback report based on identifying the bottleneck band, the channel state feedback report indicating CSI associated with the estimated wideband channel. Execution of the instructions also cause the apparatus to receive, from the base station, a transmission grant based on transmitting the channel feedback report.

In one aspect of the present disclosure, a method for wireless communication by a base station includes transmitting, to a UE, a reference signal on a wideband channel. The method further includes receiving, from the UE, a channel state feedback report based on transmitting the reference signal, the channel state feedback report indicating one or more of a location of a bottleneck band associated with the wideband channel, a wideband CSI associated with the bottleneck band, or a single respective CSI for each band, within a bandwidth, that is different than the bottleneck band. The method still further includes transmitting, to the UE, a transmission grant based on receiving the channel feedback report.

Another aspect of the present disclosure is directed to an apparatus including means for transmitting, to a UE, a reference signal on a wideband channel. The apparatus further includes means for receiving, from the UE, a channel state feedback report based on transmitting the reference signal, the channel state feedback report indicating one or more of a location of a bottleneck band associated with the wideband channel, a wideband CSI associated with the bottleneck band, or a single respective CSI for each band, within a bandwidth, that is different than the bottleneck band. The apparatus still further includes means for transmitting, to the UE, a transmission grant based on receiving the channel feedback report.

In another aspect of the present disclosure, a non-transitory computer-readable medium with non-transitory program code recorded thereon is disclosed. The program code is executed by a processor and includes program code to transmit, to a UE, a reference signal on a wideband channel. The program code further includes program code to receive, from the UE, a channel state feedback report based on transmitting the reference signal, the channel state feedback report indicating one or more of a location of a bottleneck band associated with the wideband channel, a wideband CSI associated with the bottleneck band, or a single respective CSI for each band, within a bandwidth, that is different than the bottleneck band. The program code still further includes program code to transmit, to the UE, a transmission grant based on receiving the channel feedback report.

Another aspect of the present disclosure is directed to an apparatus for wireless communications at a base station, the apparatus includes a processor, a memory coupled with the processor, and instructions stored in the memory and operable, when executed by the processor, to cause the apparatus to transmit, to a UE, a reference signal on a wideband channel. Execution of the instructions also cause the apparatus to receive, from the UE, a channel state feedback report based on transmitting the reference signal, the channel state feedback report indicating one or more of a location of a bottleneck band associated with the wideband channel, a wideband CSI associated with the bottleneck band, or a single respective CSI for each band, within a bandwidth, that is different than the bottleneck band. Execution of the instructions further cause the apparatus to transmit, to the UE, a transmission grant based on receiving the channel feedback report.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
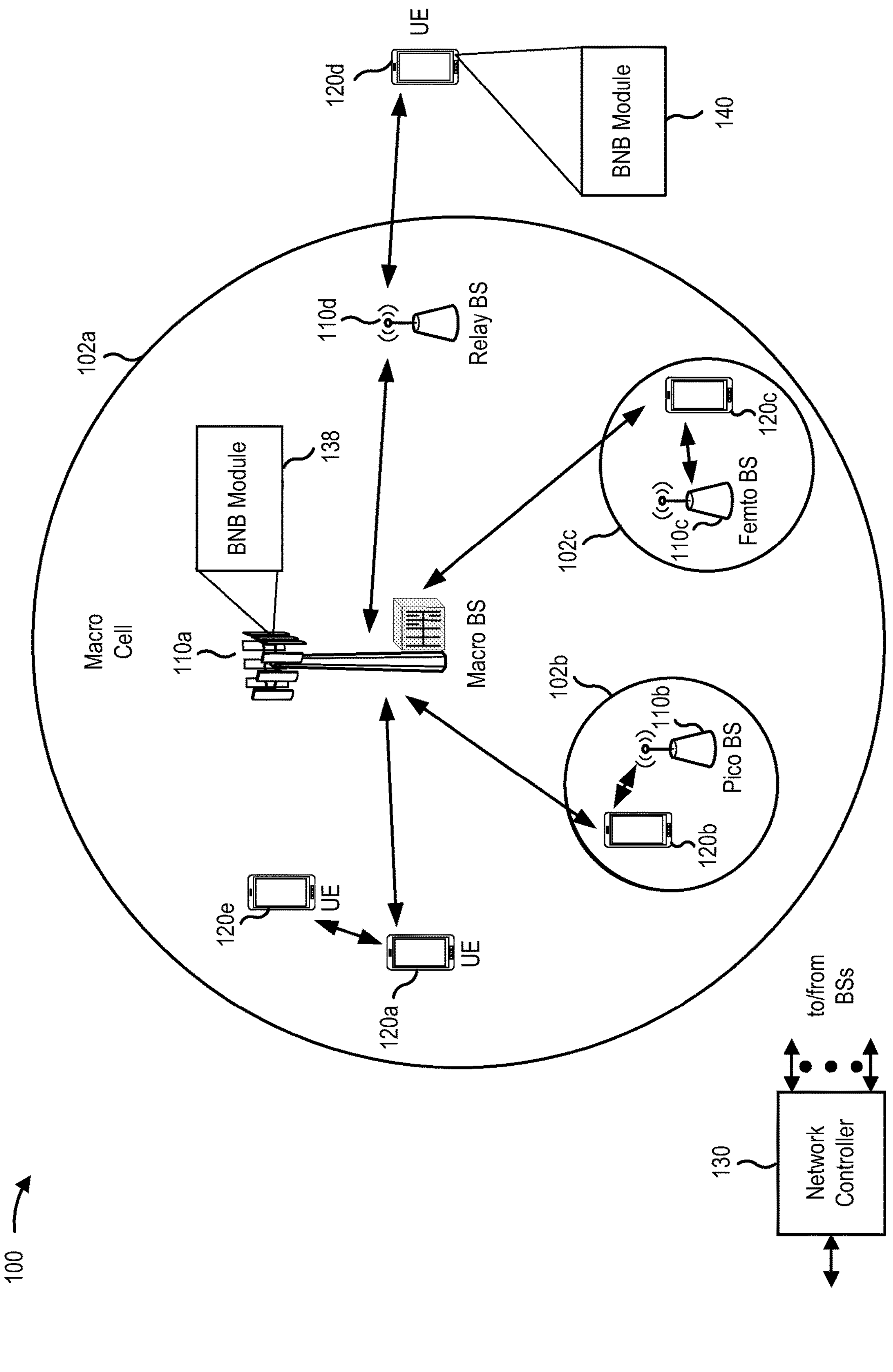
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

In some conventional wireless communication systems, a base station may transmit a reference signal (RS), such as a channel state information (CSI) RS (CSI-RS), to a user equipment (UE) and receive a channel state feedback (CSF) report, such as a CSI report, from the UE, based on measurements of the reference signal. The CSF report provides information about a channel between the base station and the UE. In such conventional wireless communication systems, the CSF report may be an implicit report, such as a Type I report or Type II report, or an explicit report, such as a report indicating channel coefficients. In some examples, the base station may use the channel information, such as a channel quality indicator (CQI) and/or a rank indicator (RI), for rate adaptation or determining an optimal number of streams to spatially multiplex. Therefore, throughput performance may be correlated with CSI accuracy. That is, throughput performance may improve as CSI accuracy improves.

In some wireless systems, a wideband CSF report, such as a wideband CSI report, may be used to reduce network overhead. In some examples, frequency selective fading may adversely affect an accuracy of the wideband CSF report. In some such examples, all code blocks (CBs) in a transport block (TB) may have a same modulation order and code rate. Still, in such examples, different CBs may experience different frequency selective fading. Additionally, transmissions from one or more neighboring base stations may partially overlap one or more resource blocks (RBs) allocated by a serving base station. In such examples, interference from the one or more neighboring base stations may aggravate the frequency selective fading.

In some cases, CB interleaving may be specified to mitigate the frequency selective fading. Some wireless communication systems, such as new radio (NR) wireless communication systems, may be limited to shallow interleaving, or no interleaving, of a CB along RBs during a process for mapping a virtual resource block (VRB) to a physical resource block (PRB). Therefore, for some wireless communication systems, it may be difficult to mitigate frequency selective fading experienced by one or more CBs in a transport block. In some examples, the frequency selective fading may cause a cyclic redundancy check (CRC) failure for a CB, resulting in a retransmission of an entire transport block, or code block group.

Wideband CSF reports may be susceptible to error if an impact of frequency selective fading on different CBs is not captured appropriately. For example, a linear combination of performance metrics over an entire wideband may be susceptible to erroneous estimates due to the frequency selective fading experienced on one or more CBs. Therefore, it may be desirable to improve an accuracy of a wideband CSF report when one or more CBs experience frequency selective fading.

Various aspects of the present disclosure are directed to improving an accuracy of a wideband CSF report when one or more CBs experience different channel conditions, such as different conditions due to noise, interference, or frequency selective fading. Some aspects more specifically relate to identifying a bottleneck within a configured bandwidth or a configured set of resources over a transmission time interval (TTI). The bottleneck may be referred to as a bottleneck band (BNB). In some examples, the BNB may be identified by a machine learning model at the UE, or associated with the UE. In some implementations, one or more metrics associated with the wideband CSF (e.g., wideband CSI) may be based on the identified BNB, as opposed to the entire wideband bandwidth. Additionally, the UE may indicate a location of the identified BNB to the base station. In such examples, the base station may refrain from scheduling a grant for a transmission within a band associated with the BNB.

Particular aspects of the subject matter described in this disclosure may be implemented to realize one or more of the following potential advantages. In some examples, the described techniques may improve throughput by increasing an accuracy of a wideband CSF. The accuracy may be improved by identifying the bottleneck band (BNB) and determining channel information, such as a CSI, based on the identified BNB. Additionally, or alternatively, the accuracy may be improved by implicitly determining CSI based on the BNB without explicitly identifying the BNB.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110*a*, BS 110*b*, BS 110*c*, and BS 110*d*) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/ sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a bottleneck band (BNB) module 140. For brevity, only one UE 120*d* is shown as including the BNB module 140. The BNB module 140 may to receive, from a base station 110, a reference signal on a wideband channel; estimate the wideband channel based on receiving the reference signal; identify a bottleneck band of the wideband channel based on a metric associated with the estimated wideband channel; transmit, to the base station 110, a channel state feedback report based on identifying the bottleneck band, the channel state feedback report indicating CSI associated with the estimated wideband channel; and receive, from the base station, a transmission grant based on transmitting the channel feedback report.

Additionally, or alternatively, the base stations 110 may include a bottleneck band (BNB) module 138. For brevity, only one base station 110 is shown as including the BNB module 138. The BNB module 138 may transmit, to a UE 120, a reference signal on a wideband channel; receive, from the UE 120, a channel state feedback report based on transmitting the reference signal, the channel state feedback report indicating one or more of a location of a bottleneck band associated with the wideband channel, a wideband CSI associated with the bottleneck band, or a single respective CSI for each band, within a bandwidth, that is different than the bottleneck band; and transmit, to the UE 120, a transmission grant based on receiving the channel feedback report Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
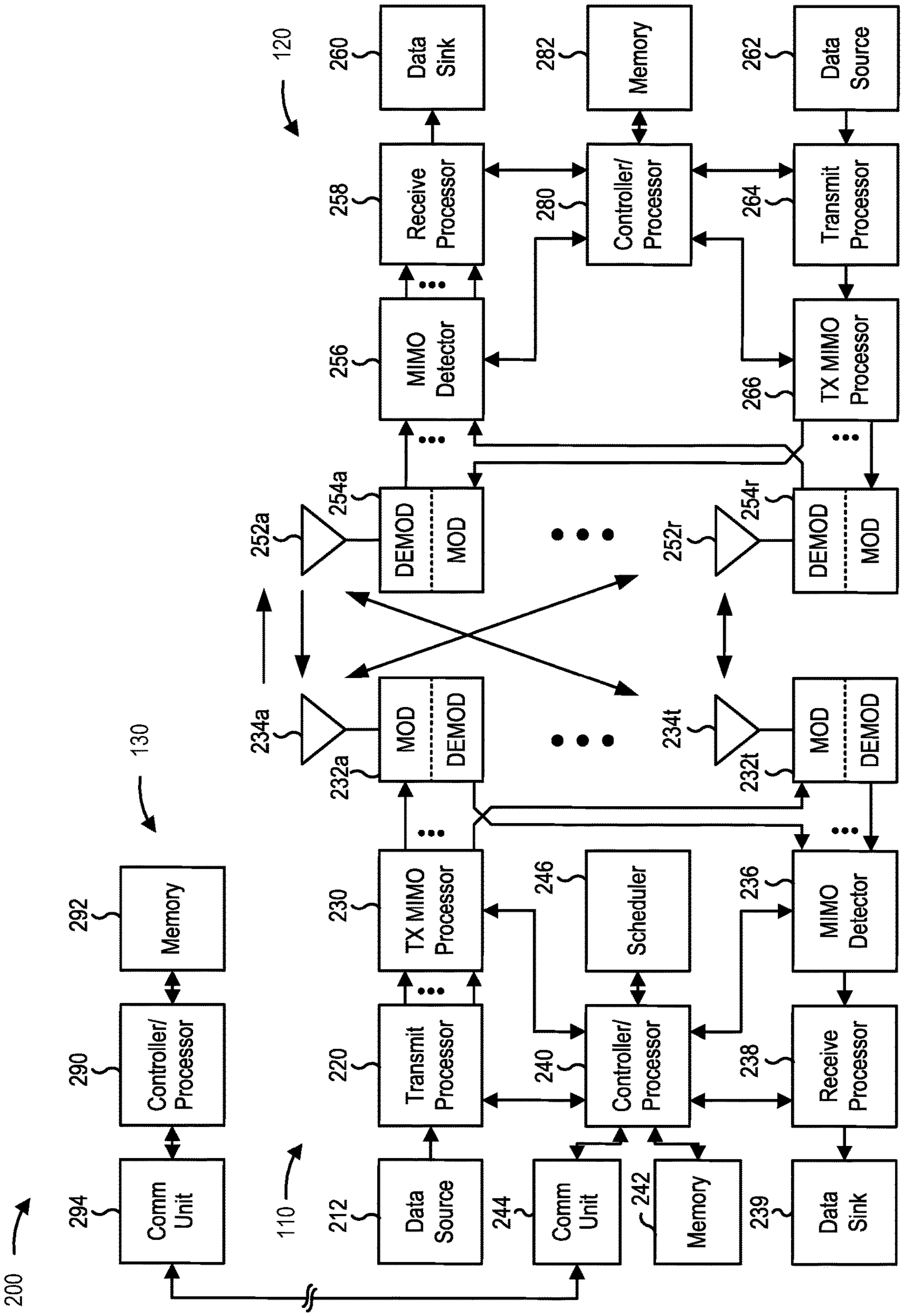
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with identifying a bottleneck band or processing information associated with a bottleneck band as described in more detail elsewhere. For example, the controller/processor 240 of the base station 110, the controller/processor 280 of the UE 120, and/or any other component(s) of FIG. 2 may perform or direct operations of, for example, the processes of FIGS. 10 and 12 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, from a base station, a reference signal on a wideband channel; means for estimating, at the UE, the wideband channel based on receiving the reference signal; means for identifying, at the UE, a bottleneck band of the wideband channel based on a metric associated with the estimated wideband channel; means for transmitting, to the base station, a channel state feedback report based on identifying the bottleneck band, the channel state feedback report indicating CSI associated with the estimated wideband channel; means for receiving, from the base station, a transmission grant based on transmitting the channel feedback report. Such means may include one or more components of the UE 120 described in connection with FIG. 2.

In some aspects, the base station 110 may include means for transmitting, to a UE, a reference signal on a wideband channel; means for receiving, from the UE, a channel state feedback report based on transmitting the reference signal, the channel state feedback report indicating one or more of a location of a bottleneck band associated with the wideband channel, a wideband CSI associated with the bottleneck band, or a single respective CSI for each band, within a bandwidth, that is different than the bottleneck band; and means for transmitting, to the UE, a transmission grant based on receiving the channel feedback report. Such means may include one or more components of the base station 110 described in connection with FIG. 2.

As indicated above, FIG. 2 is provided merely as an example. Other examples may differ from what is described with regard to FIG. 2. In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
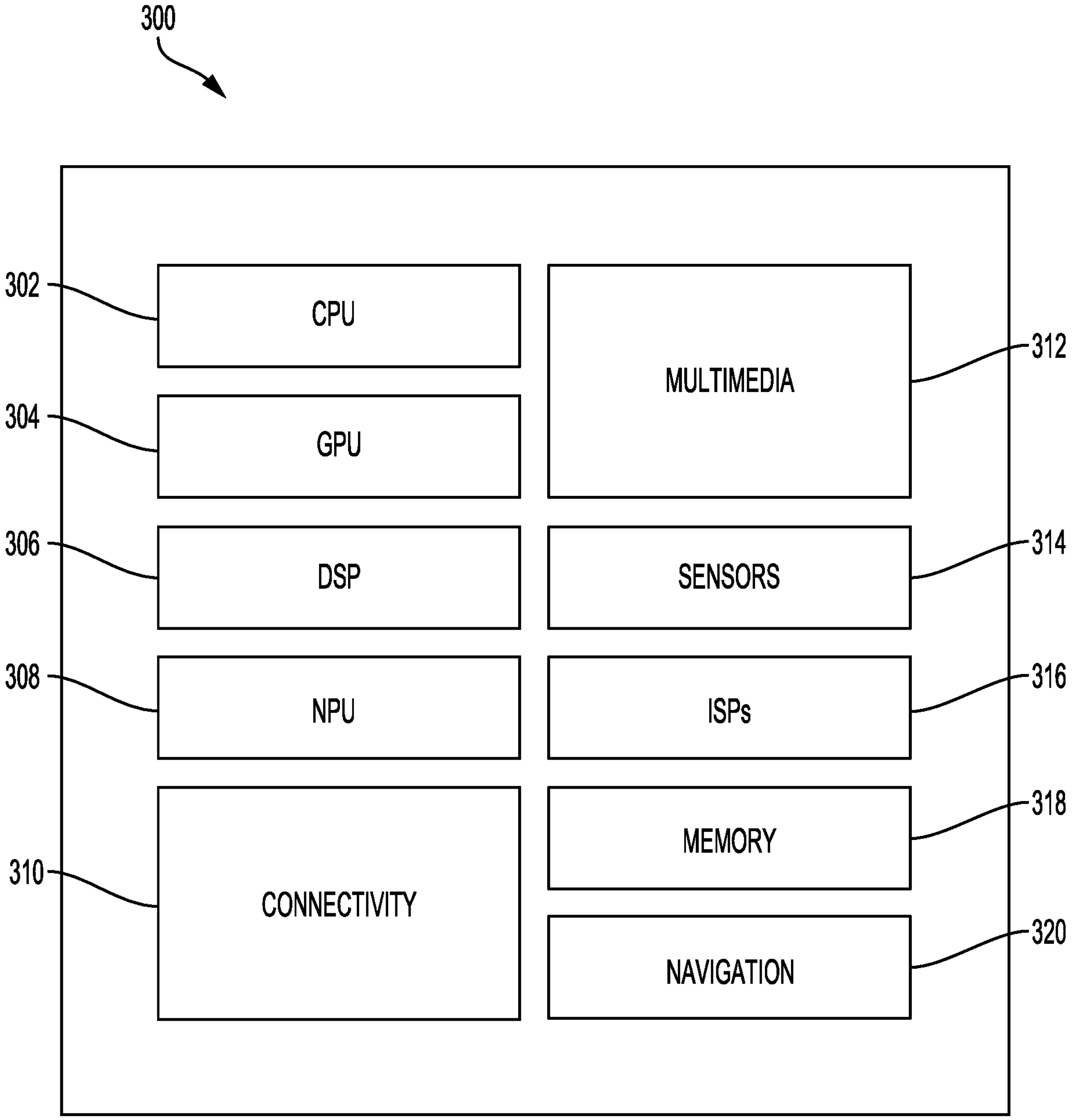
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive, from a base station, a reference signal on a wideband channel. The general-purpose processor 302 further includes program code to estimate, at the UE, the wideband channel based on receiving the reference signal. The general-purpose processor 302 still further includes program code to identify, at the UE, a bottleneck band of the wideband channel based on a metric associated with the estimated wideband channel. The general-purpose processor 302 also includes program code to transmit, to the base station, a channel state feedback report based on identifying the bottleneck band, the channel state feedback report indicating CSI associated with the estimated wideband channel. The general-purpose processor 302 further includes program code to receive, from the base station, a transmission grant based on transmitting the channel feedback report.

In another aspect of the present disclosure, the general-purpose processor 302 includes program code to transmit, to a UE, a reference signal on a wideband channel. The general-purpose processor 302 further includes program code to receive, from the UE, a channel state feedback report based on transmitting the reference signal, the channel state feedback report indicating one or more of a location of a bottleneck band associated with the wideband channel, a wideband CSI associated with the bottleneck band, or a single respective CSI for each band, within a bandwidth, that is different than the bottleneck band. The general-purpose processor 302 still further includes program code to transmit, to the UE, a transmission grant based on receiving the channel feedback report.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
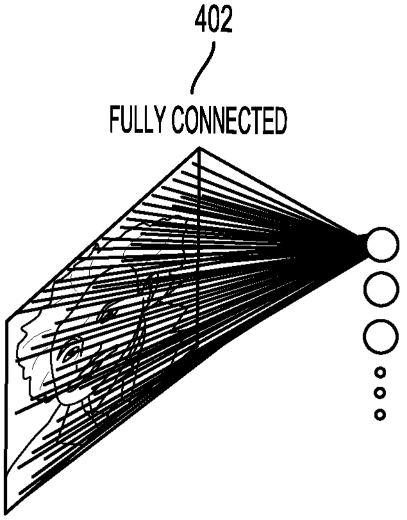
FIGS. 4A, 4B, and 4C are diagrams illustrating a neural network, in accordance with aspects of the present disclosure.
Figure 4B:
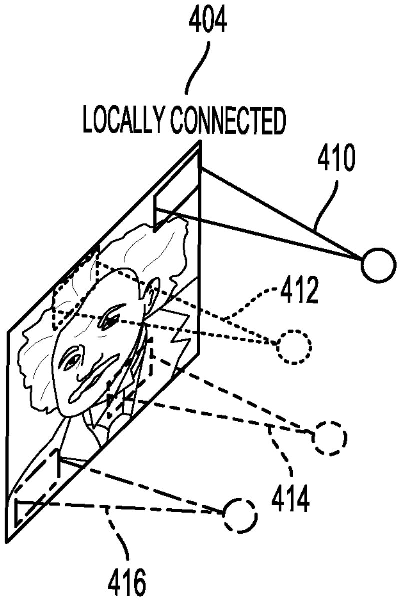

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
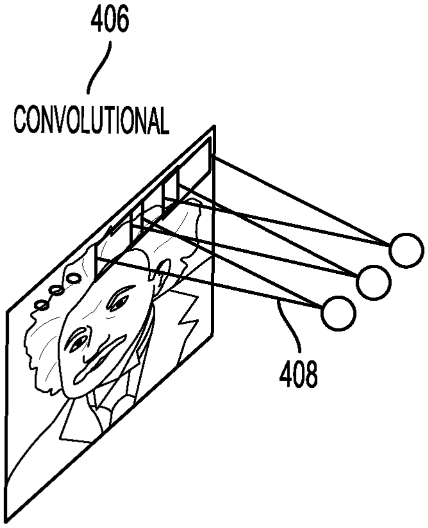

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
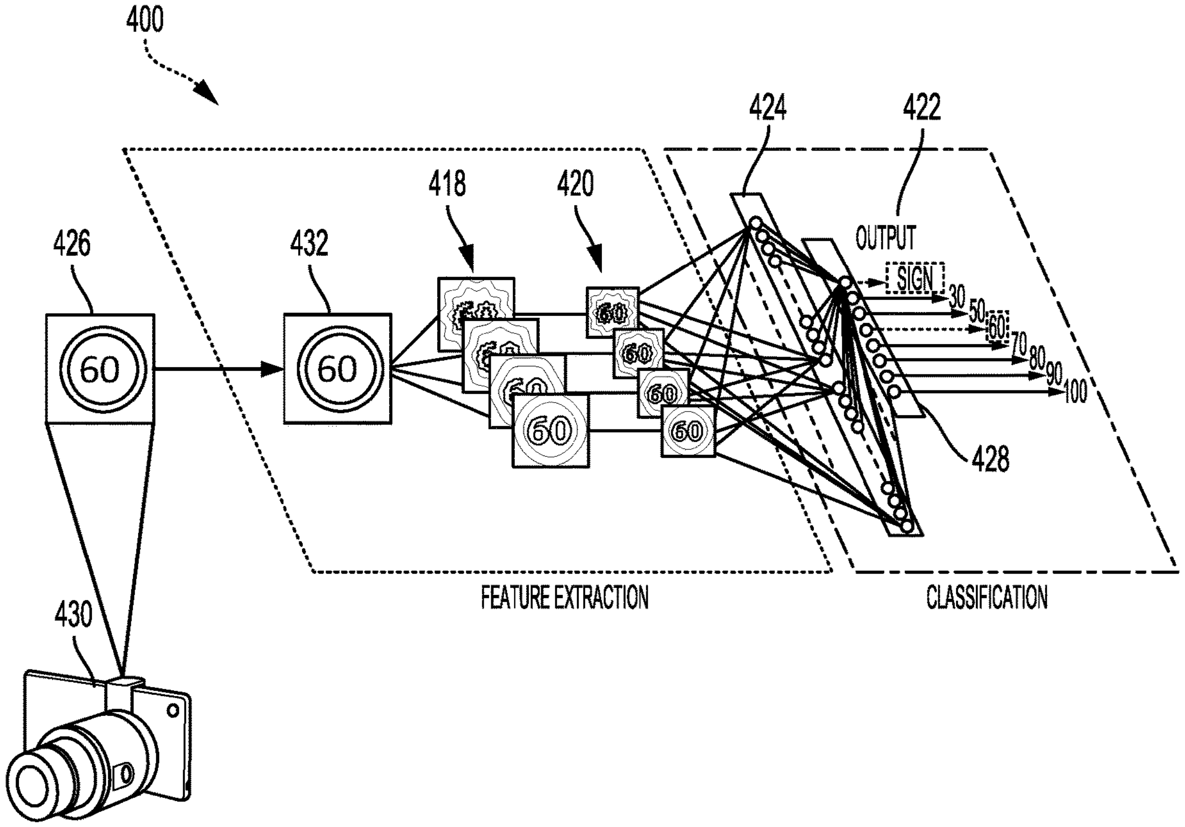
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
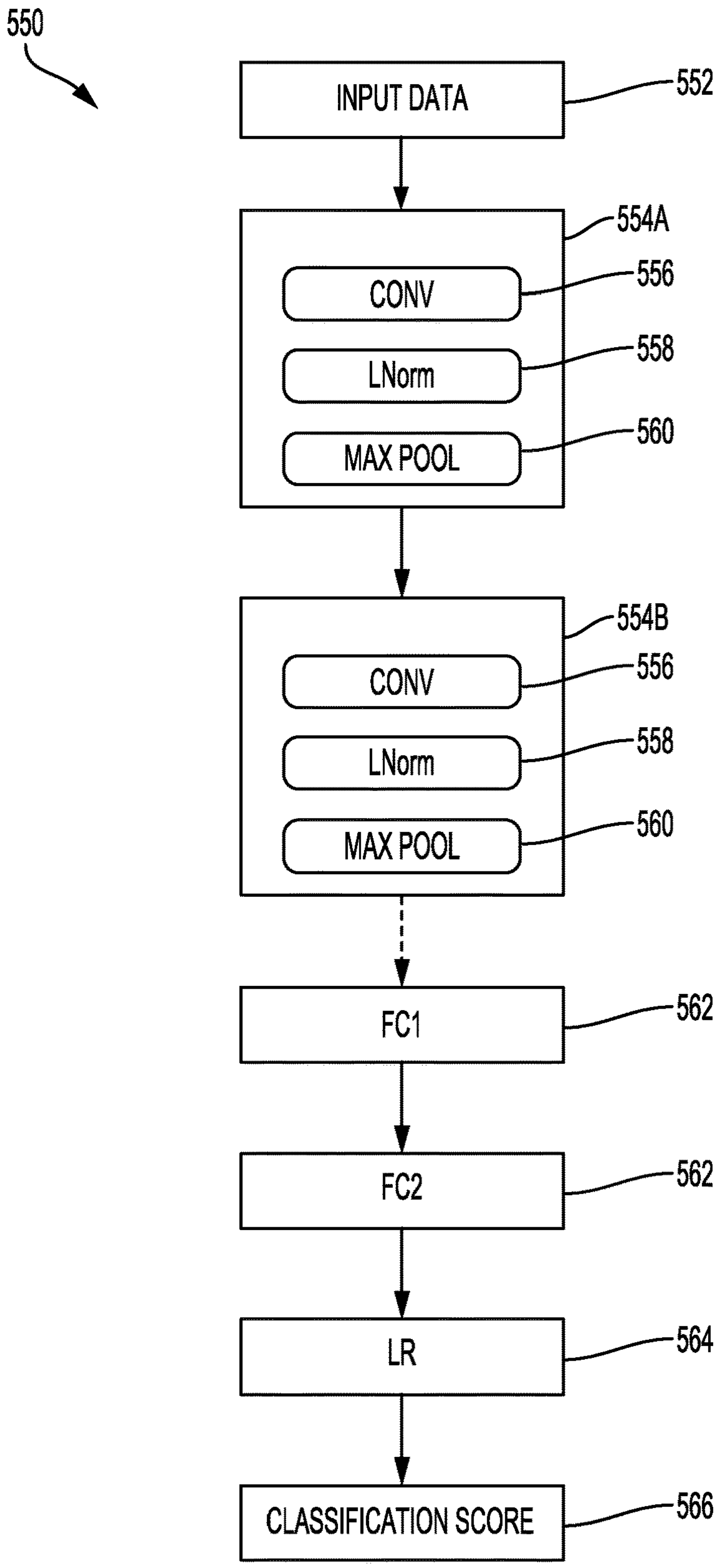
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

In some conventional wireless communication systems, a base station may transmit a reference signal (RS), such as a channel state information (CSI) RS (CSI-RS), to a user equipment (UE) and receive a channel state feedback (CSF) report, such as a CSI report, from the UE, based on measurements of the reference signal. The CSF report provides information for a channel between the base station and the UE. In such conventional wireless communication systems, the CSF report may be an implicit report, such as a Type I report or Type II report, or an explicit report, such as a report indicating channel coefficients.

In some wireless systems, a wideband CSF report, such as a wideband CSI report, may be used to reduce network overhead. In some examples, channel conditions, such as noise, interference, and/or frequency selective fading may adversely affect an accuracy of the wideband CSF report. In some such examples, all code blocks (CBs) in a transport block (TB) may have a same modulation order and code rate. Still, in such examples, different CBs may experience different channel conditions. Additionally, transmissions from one or more neighboring base stations may partially overlap one or more resource blocks (RBs) allocated by a serving base station. In such examples, interference from the one or more neighboring base stations may aggravate the frequency selective fading.

Wideband CSF reports may be susceptible to error if an impact of frequency selective fading on different CBs is not captured appropriately. For example, a linear combination of performance metrics over an entire wideband may be susceptible to erroneous estimates due to the frequency selective fading experienced on one or more CBs. Therefore, it may be desirable to improve an accuracy of a wideband CSF report when one or more CBs experience frequency selective fading.

Various aspects of the present disclosure are directed to improving an accuracy of a wideband CSF report when one or more codebooks (CBs) experience frequency selective fading. Some aspects more specifically relate to identifying a bottleneck within a configured bandwidth. The bottleneck may be referred to as a bottleneck band (BNB). An amount of bandwidth that a codebook occupies may be a function of one or more of a rank, modulation order, or code rate. The amount of bandwidth occupied by the codebook may be referred to as the BNB size. In some examples, the BNB may be identified by a machine learning model at the UE, or associated with the UE. In some implementations, one or more metrics associated with the wideband CSF (e.g., wideband CSI) may be based on the identified BNB, as opposed to the entire wideband bandwidth. Additionally, the UE may indicate a location of the identified BNB to the base station. In such examples, the base station may refrain from scheduling a grant for a transmission within a band associated with the BNB.

Figure 6A:
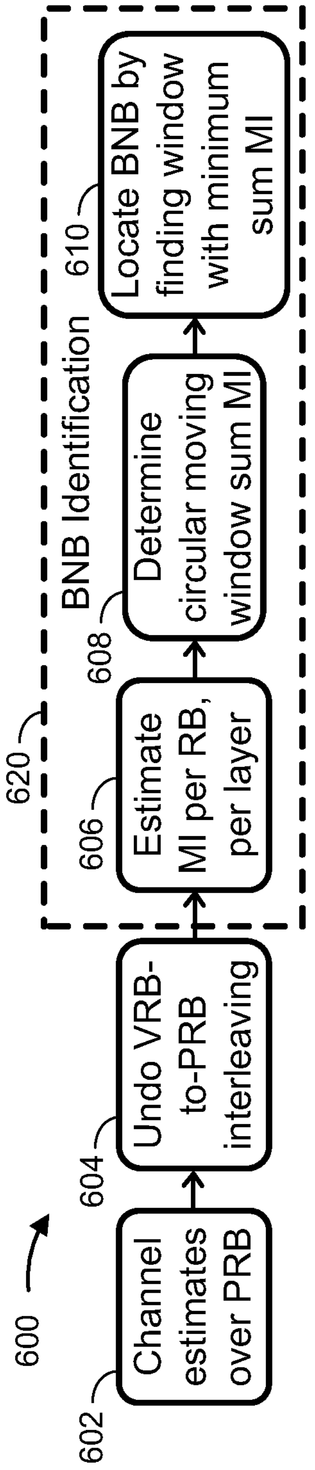
FIG. 6A is a flow diagram illustrating an example of process for identifying a bottleneck band (BNB), in accordance with aspects of the present disclosure.

FIG. 6A is a flow diagram illustrating an example of process 600 for identifying a BNB, in accordance with aspects of the present disclosure. In some implementations, a BNB may be identified based on a performance metric specified for each resource block of each spatial multiplexed layer. In some examples, the performance metric may be mutual information between channel bits and corresponding log likelihood ratios (LLRs) at the UE for each resource block of each layer. The channel bits may be a quantity of channel bits transmitted after coding, at the base station. In some other examples, the performance metric may be an average spectral efficiency over a number of resource blocks. The process 600 may be performed by a UE, such as a UE 120 as described with reference to FIGS. 1 and 2. As shown in FIG. 6A, at block 602, the process 600 performs channel estimates based on one or more reference signals transmitted in a physical resource block. The one or more reference signals may be transmitted by a base station, such as a base station 110 described with reference to FIGS. 1 and 2.

At block 604, the process 600 may undo virtual resource block (VRB) to physical resource block (PRB) interleaving, if such interleaving was applied to the physical resource block. Additionally, at block 606, the process 600 may estimate mutual information (MI) for each resource block (RB) of each layer. The mutual information may be associated with a performance metric, such as mutual information between channel bits and corresponding LLRs at the UE for each resource block of each layer. In some other examples, the performance metric may be an average spectral efficiency over a subset of resource blocks. At block 608, the process 600 determines the performance metric sum at each window location of a circular moving window. The window location may correspond to a subset of resource blocks of a number of resource blocks associated with a transmission received at the UE. For example, the UE may receive a transmission on resource block indices zero to one hundred twenty. In this example, the window may span forty resource blocks and may move over the span of resource blocks from zero to one hundred twenty.

As shown in FIG. 6A, at block 610, the process 600 identifies a location of a BNB based on the performance metric determined at each window location of the circular moving window. In some examples, the location of the BNB corresponds to the location associated with a minimum sum of the mutual information of each resource block of each layer. As an example, the location of the BNB may correspond to the location associated with the lowest LLR sum of the LLRs of each resource block of each layer. The operations performed at blocks 606, 608, and 610 may be operations of a BNB identification operation 620.

Figure 6B:
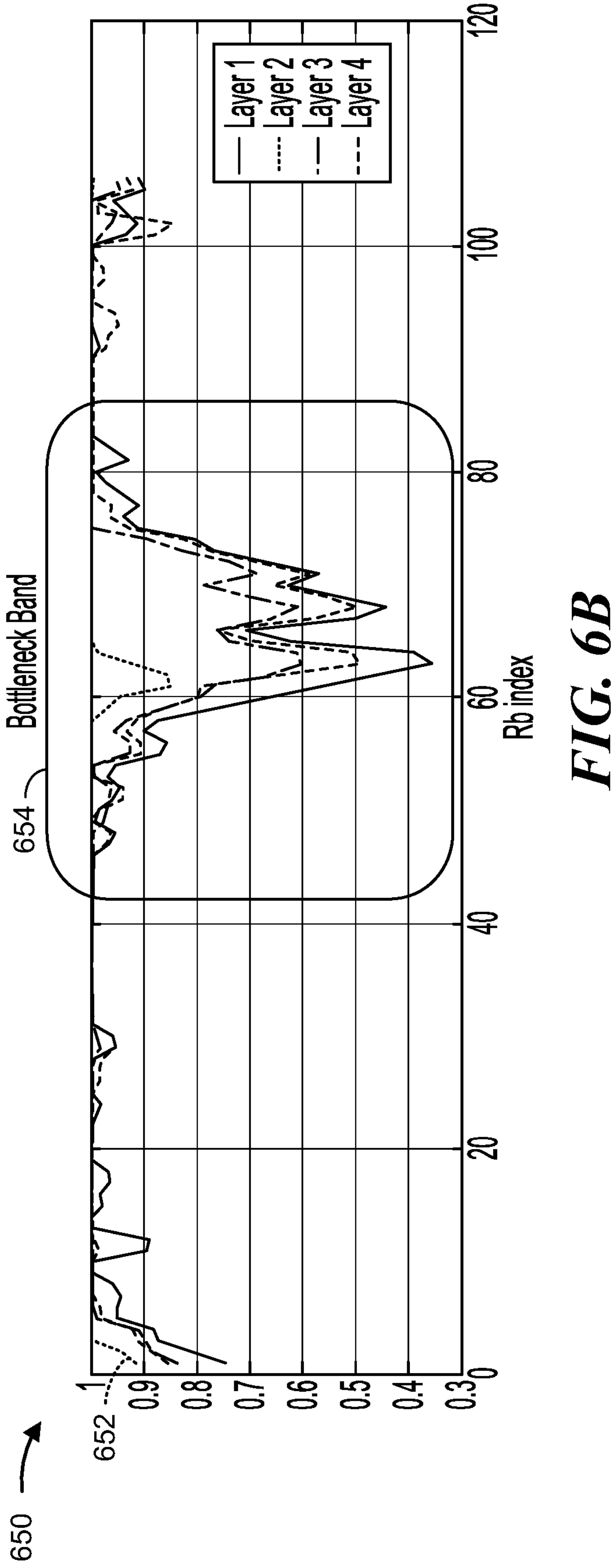
FIG. 6B is a graph illustrating an example of identifying a location of a BNB, in accordance with aspects of the present disclosure.

FIG. 6B is a graph 650 illustrating an example of identifying a location of a BNB, in accordance with aspects of the present disclosure. In the example of FIG. 6B, a performance metric 652 may be determined for each spatial layer (shown as layers 1 to 4) of each resource block (shown as RB index 0 to 120). In the example of FIG. 6B, the performance metric 652 may be the mutual information between channel bits and corresponding receiver LLRs. A window 654 may move over a range of RB indices from RB index 0 to RB index 120. Each window location may correspond to a different range of RB indices. In the example of FIG. 6B, the location of the window 654 corresponds to a range of indices from RB index 40 to 80. The location of the window 654 in FIG. 6B corresponds to the location of the BNB. Specifically, in this example, the sum of the mutual information associated with each layer of each RB within the window 654 is the lowest sum in comparison to a sum determined for other locations along the entire range of RB indices (e.g., from RB index 0 to RB index 120). The lowest sum of the mutual information may be referred to as the minimum sum mutual information. In some examples, the mutual information may be low as a result of frequency selective fading.

Figure 6C:
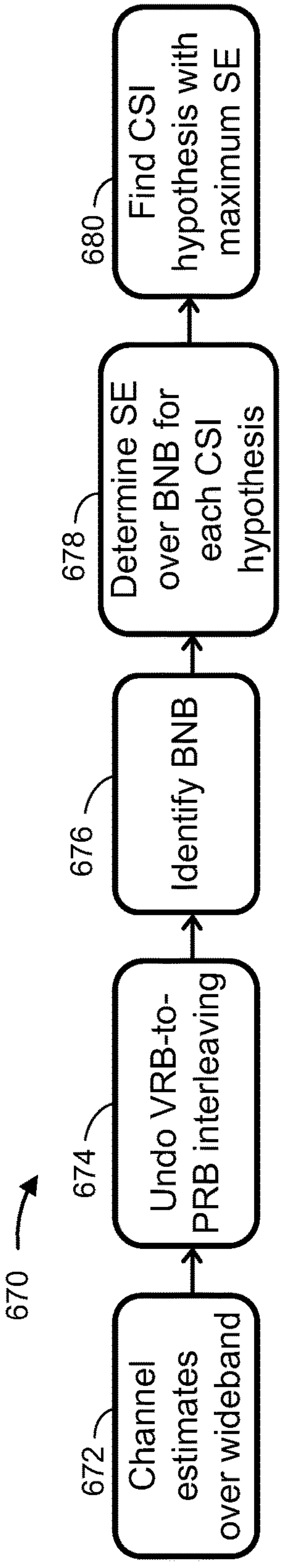
FIG. 6C is a flow diagram illustrating an example of a process for estimating wideband channel state information (CSI), in accordance with aspects of the present disclosure.

In some conventional wireless communication systems, the wideband CSI may be based on the entire bandwidth configured for the UE. In contrast, in some implementations, a wideband CSI may be determined as a function of a channel over the BNB. FIG. 6C is a flow diagram illustrating an example of process 670 for estimating wideband CSI, in accordance with aspects of the present disclosure. In the example of FIG. 6C, the operations performed at blocks 672 and 674 are the same as described with respect to blocks 602 and 604, respectively, of FIG. 6A. For brevity, description of the operations at blocks 672 and 674 of FIG. 6C is omitted. Additionally, the operations performed at block 676 are the same as described with respect to blocks 606, 608, and 610 of FIG. 6A. For brevity, description of the operations at blocks 676 of FIG. 6C is omitted.

As shown in FIG. 6C, after identifying the BNB (block 676), the process 670 determines a spectral efficiency (SE) over the identified BNB for each CSI hypothesis (e.g., inference hypothesis), at block 678. That is, the process 670 only uses features associated with the BNB to determine the spectral efficiency. Aspects of the present disclosure are not limited to determining the spectral efficiency, other performance metrics are contemplated. At block 680, the process 670 identifies the CSI hypothesis associated with a maximum spectral efficiency (e.g., greatest spectral efficiency) of all the spectral efficiencies determined at block 678. In some examples, the CSI hypothesis identified at block 680 may be reported in a feedback report, such as a CSI report.

Figure 7:
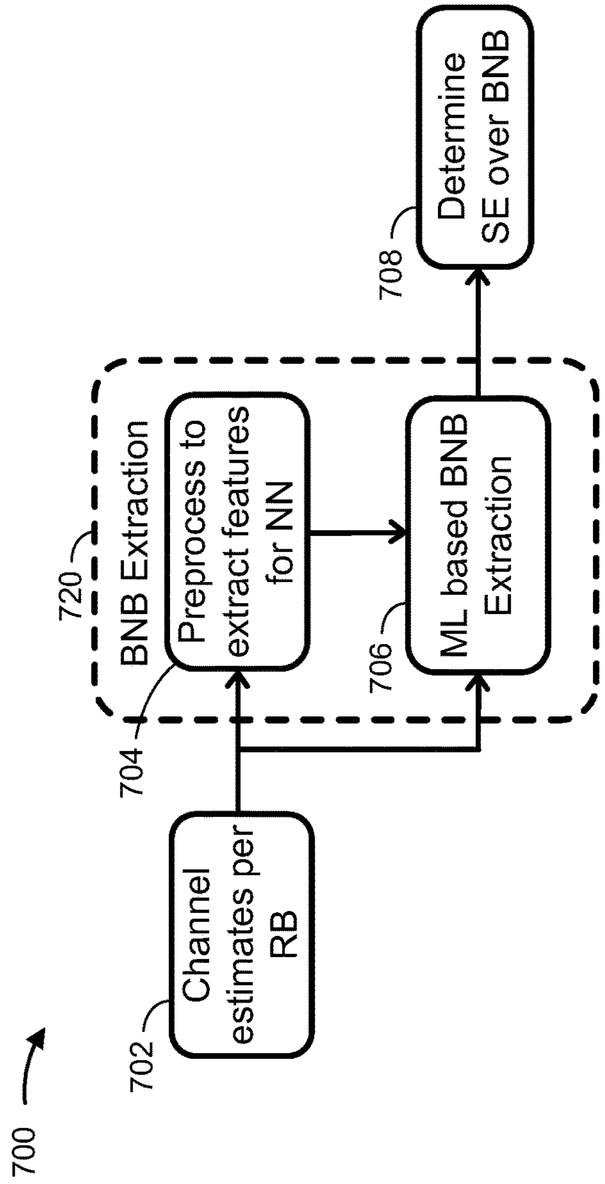
FIG. 7 is a flow diagram illustrating an example of a process for identifying a bottleneck band via a machine learning model, in accordance with aspects of the present disclosure.

In some implementations, a machine learning model may identify the bottleneck band (BNB). FIG. 7 is a flow diagram illustrating an example of a process 700 for identifying a bottleneck band via a machine learning model, in accordance with aspects of the present disclosure. The process 700 may be implemented at one or more components of a UE, such as a UE 120 described with reference to FIGS. 1 and 2. For example, one or more operations of the process 700 may be implemented at a machine learning model of the UE. The machine learning model may be an artificial neural network (e.g., convolutional neural network), a decision tree, or another type of machine learning model. As shown in FIG. 7, at block 702, the process 700 receives channel estimates for each resource block. The channel estimates may be based on a reference signal, such as a CSI reference signal (CSI-RS), transmitted by a base station, such as a base station 110 described with reference to FIGS. 1 and 2. The channel estimates of block 702 may be one example of an input to the machine learning model.

As shown in FIG. 7, at block 704, one or more preprocessors may extract features from the channel estimates. The features may be a function of a channel, such as a function of a channel matrix. For example, the features may be a minimum mean square error (MMSE), a signal-to-noise ratio (SNR), or non-reciprocal channel (NRC) covariance matrices (R matrices). At block 706, the machine learning model may identify the BNB based on the features extracted at block 704 and the channel estimates of block 702. In some examples, at block 706, the machine learning model infers a performance metric for each bandwidth part. As discussed, the performance metric may be the minimum information, the spectral efficiency, or another type of performance metric. Additionally, at block 706, the process 700 may identify the location of the BNB based on the performance metric. In some examples, at block 706, the process 700 extracts the identified BNB. The extracted BNB may be referred to as a region of interest (ROI). The operations performed at blocks 704 and 706 may be operations of a BNB extraction operation 720. As shown in FIG. 7, at block 708, the process 700 determines a spectral efficiency over the BNB identified at block 706.

Figure 8:
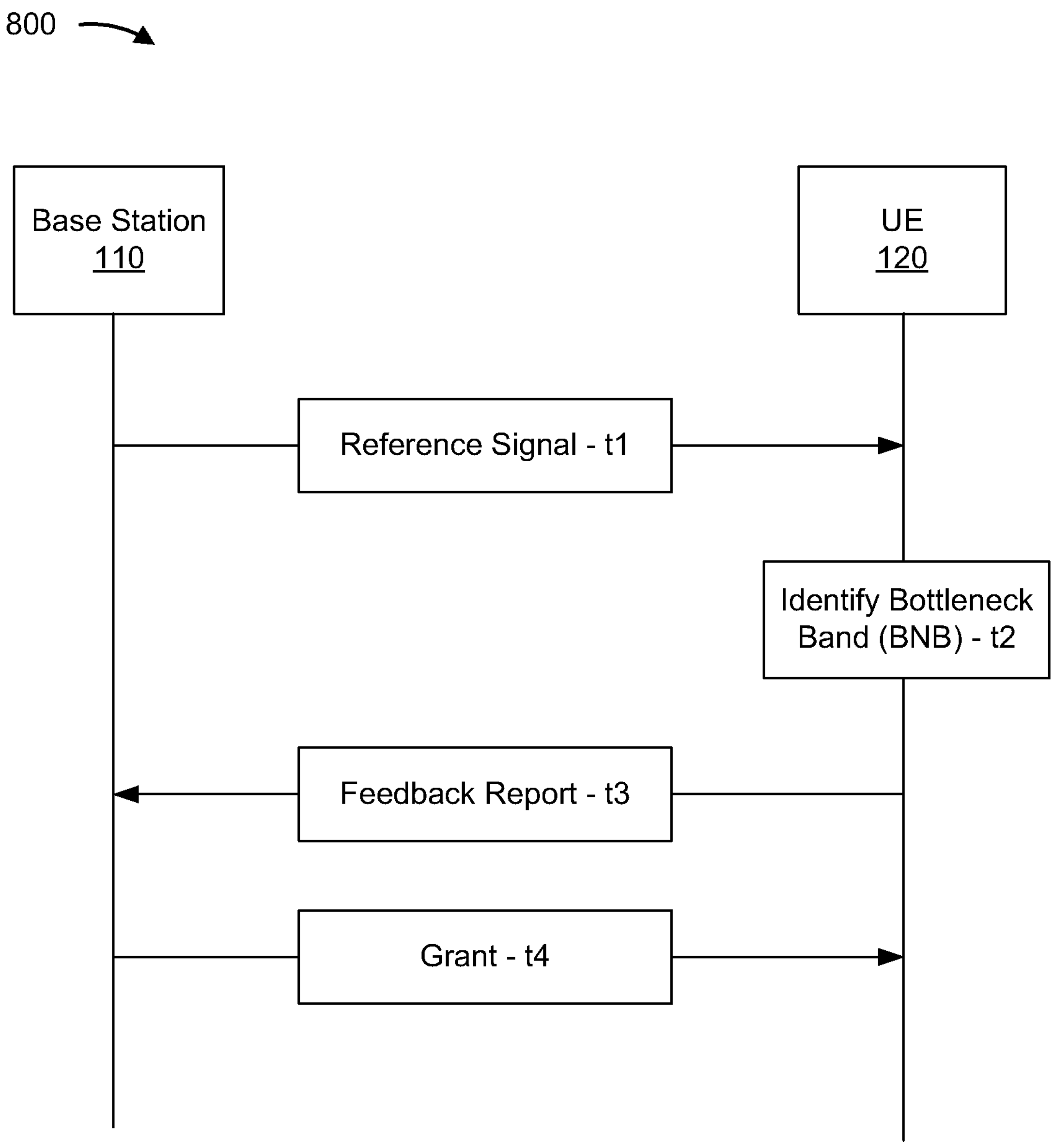
FIG. 8 is a timing diagram illustrating an example of identifying a BNB, in accordance with aspects of the present disclosure.

As discussed, various aspects of the present disclosure are directed to identifying a bottleneck band (BNB) at a UE. FIG. 8 is a timing diagram illustrating an example 800 of identifying a BNB, in accordance with aspects of the present disclosure. As shown in FIG. 8, at time t1, a base station 110 transmits a reference signal, such as a CSI-RS, to a UE 120. At time t2, the UE 120 may identify a BNB within a bandwidth configured for the UE based on measurements of the reference signal received at time t1. In some examples, the reference signal may be used for determining channel estimates, such as the channel estimates described in FIGS. 6A, 6C, and 7. In such examples, the channel estimates may be used to identify the BNB. The BNB may be identified based on a performance metric, as discussed with reference to FIGS. 6A and 6C. In some examples, as discussed in the process 700 of FIG. 7, the BNB may be identified by a machine learning model.

As shown in FIG. 8, at time t3, the UE 120 may transmit a feedback report indicating a channel measurement (e.g., channel state information (CSI)) based on the measurements of the reference signal. In some implementations, the feedback report also indicates the location of the BNB identified at time t2. Additionally, or alternatively, the channel measurement indicated by the feedback report may be a wideband measurement (e.g., wideband CSI) based on the identified BNB. As discussed in the process 670 of FIG. 6C, the UE 120 may use the BNB, identified at time t2, for the wideband measurement instead of using the entire configured wideband. In some such examples, the channel measurement may be a CSI hypothesis associated with a maximum spectral efficiency. Additionally, or alternatively, the feedback report may indicate a CSI for each band within a bandwidth, excluding the portion of the bandwidth associated with the BNB. Accordingly, in the example 800 of FIG. 8, the feedback report transmitted at time t3 may indicate one or more of the location of the BNB, a wideband measurement based on the identified BNB, or the CSI for the entire bandwidth, excluding the portion of the bandwidth associated with the BNB. The CSI may include a channel quality indicator (CQI), a pre-coding matrix indicator (PMI), a rank indicator (RI), and/or other information.

At time t4, the base station 110 may transmit a grant to the UE 120 based on the feedback report. The grant may be used to grant an uplink or downlink transmission. A modulation and coding scheme (MCS), a number of spatial multiplexed layers, or a pre-coding matrix indicator (PMI) of the transmission may be based on the feedback report. In some examples, the base station 110 may refrain from scheduling a grant for a transmission within a band associated with the BNB. In such examples, the base station 110 may use the CSI for the rest of the band to determine the MCS, PMI, and/or the number of spatial multiplexed layers for a grant in the rest of the band. Using the CSI for the rest of the band to determine the MCS, PMI, and/or the number of spatial multiplexed layers for the grant may improve spectral efficiency for one or more UEs in a wireless communication system.

The example 800 of FIG. 8 is not limited to the UE 120 identifying the BNB. In some implementations, the base station 110 may identify the BNB based on measurements of one or more reference signals transmitted by the UE 120. In some examples, the one or more reference signals may be used for determining channel estimates. In such examples, the channel estimates may be used to identify the BNB. The BNB may be identified based on a performance metric, as discussed with reference to FIGS. 6A and 6C. In some examples, as discussed in the process 700 of FIG. 7, the BNB may be identified by a machine learning model.

In some implementations, the base station 110 may determine a wideband measurement (e.g., wideband CSI) based on the identified BNB. In some such examples, the channel measurement may be a CSI hypothesis associated with a maximum spectral efficiency. Additionally, or alternatively, the base station 110 may determine a CSI for each band within a bandwidth, excluding the portion of the bandwidth associated with the BNB. After identifying the BNB, the base station 110 may transmit a grant to the UE 120 based on the identified BNB. The grant may be used to grant an uplink or downlink transmission. A modulation and coding scheme (MCS), a number of spatial multiplexed layers, or a pre-coding matrix indicator (PMI) of the transmission may be based on the identified BNB. In some examples, the base station 110 may refrain from scheduling a grant for a transmission within a band associated with the BNB. In such examples, the base station 110 may use the CSI for the rest of the band to determine the MCS, PMI, and/or the number of spatial multiplexed layers for a grant in the rest of the band. Using the CSI for the rest of the band to determine the MCS, PMI, and/or the number of spatial multiplexed layers for the grant may improve spectral efficiency for one or more devices in a wireless communication system.

Figure 9:
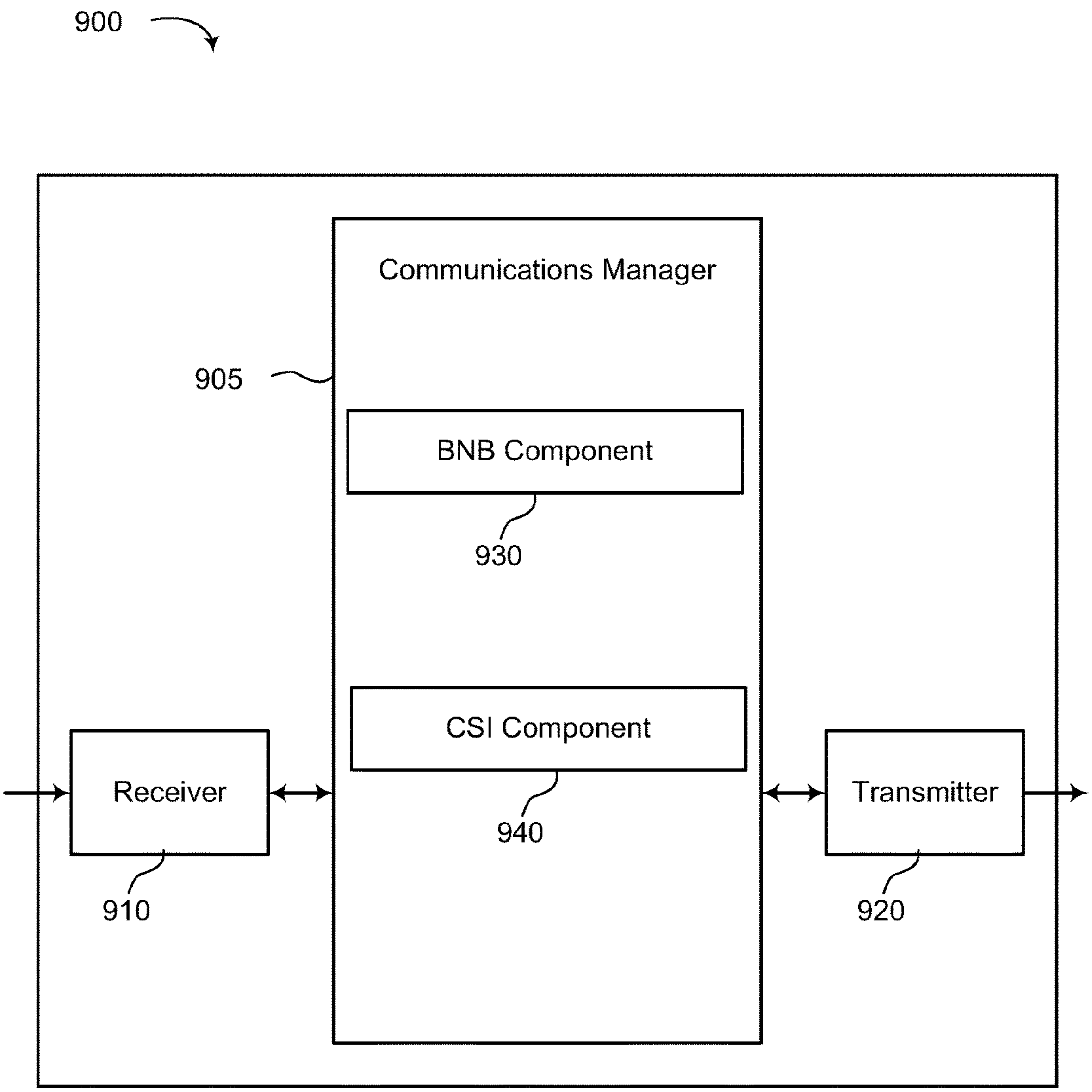
FIG. 9 is a block diagram of a wireless communication device that identifies a BNB, in accordance with aspects of the present disclosure.

FIG. 9 is a block diagram illustrating an example wireless communication device that supports identifying a BNB, in accordance with some aspects of the present disclosure. The device 900 may be an example of aspects of a UE 120 described with reference to FIGS. 1, 2, and 8. The wireless communications device 900 may include a receiver 910, a communications manager 905, a transmitter 920, a BNB component 930, and a CSI component 940, which may be in communication with one another (for example, via one or more buses). In some examples, the wireless communications device 900 is configured to perform operations, including operations of the process 700 described below with reference to FIG. 7.

In some examples, the wireless communications device 900 can include a chip, chipset, package, or device that includes at least one processor and at least one modem (for example, a 5G modem or other cellular modem). In some examples, the communications manager 905, or its subcomponents, may be separate and distinct components. In some examples, at least some components of the communications manager 905 are implemented at least in part as software stored in a memory. For example, portions of one or more of the components of the communications manager 905 can be implemented as non-transitory code executable by the processor to perform the functions or operations of the respective component.

The receiver 910 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communications devices via various channels including control channels (for example, a physical downlink control channel (PDCCH) or physical uplink control channel (PUCCH)) and data channels (for example, a physical downlink shared channel (PDSCH) or a physical uplink shared channel (PUSCH)). The other wireless communications devices may include, but are not limited to, a base station 110 or UE 90 described with reference to FIG. 1.

The received information may be passed on to other components of the device 900. The receiver 910 may be an example of aspects of the receive processor 238, 258 described with reference to FIG. 2. The receiver 910 may include a set of radio frequency (RF) chains that are coupled with or otherwise utilize a set of antennas (for example, the set of antennas may be an example of aspects of the antennas 252*a*, 234*a* through 252*r*, 234*t* described with reference to FIG. 2).

The transmitter 920 may transmit signals generated by the communications manager 905 or other components of the wireless communications device 900. In some examples, the transmitter 920 may be collocated with the receiver 910 in a transceiver. The transmitter 920 may be an example of aspects of the transmit processor 220, 264 described with reference to FIG. 2. The transmitter 920 may be coupled with or otherwise utilize a set of antennas (for example, the set of antennas may be an example of aspects of the antennas 252*a*, 234*a* through 252*r*, 234*t* described with reference to FIG. 2), which may be antenna elements shared with the receiver 910. In some examples, the transmitter 920 is configured to transmit control information in a PUCCH or PDCCH and data in a physical uplink shared channel (PUSCH) or PDSCH.

The communications manager 905 may be an example of aspects of the controller/processor 240, 280 described with reference to FIG. 2. The communications manager 905 may include the BNB component 930 and the CSI component 940. Working in conjunction with the receiver 910, the BNB component 930 may receive, from a base station, a reference signal on a wideband channel. The BNB component 930 may also estimate the wideband channel based on receiving the reference signal, and identify, at the UE, a bottleneck band of the wideband channel based on a metric associated with the estimated wideband channel. Working in conjunction with the BNB component 930 and the transmitter 920, the CSI component 940 may transmit, to the base station, a channel state feedback report based on identifying the bottleneck band, the channel state feedback report indicating CSI associated with the estimated wideband channel. The receiver 910 may receive, from the base station, a transmission grant based on transmitting the channel feedback report.

Figure 10:
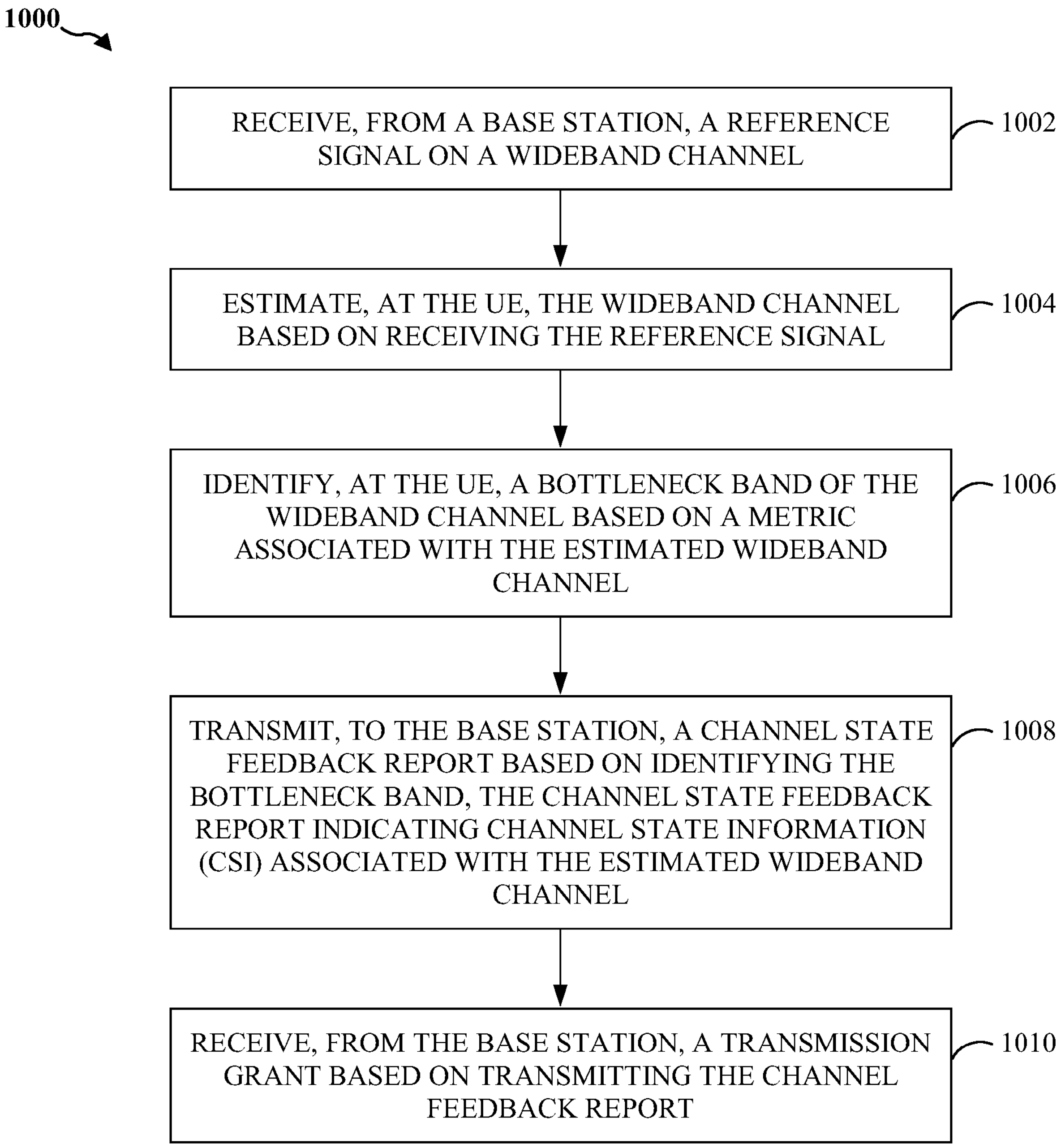
FIG. 10 is a flow diagram illustrating an example process for identifying a BNB, by a UE, in accordance with some aspects of the present disclosure.

FIG. 10 is a flow diagram illustrating an example process 1000 for identifying a BNB, by a UE, in accordance with some aspects of the present disclosure. The process 1000 may be performed by a UE, such as a UE 120 described with reference to FIGS. 1, 2, and 8. Additionally, one or more operations of the process 1000 may be performed by a machine learning model, such as the machine learning model described with reference to FIG. 4.

As shown in FIG. 10, the process 1000 begins at block 1002 by receiving, from a base station, a reference signal on a wideband channel. At block 1004, the process 1000 estimates, at the UE, the wideband channel based on receiving the reference signal. At block 1006, the process 1000 identifies, at the UE, a bottleneck band of the wideband channel based on a metric associated with the estimated wideband channel. In some examples, a machine learning model is used to identify the bottleneck band. The metric may include mutual information between channel bits transmitted by the base station and a log likelihood ratio (LLR), of the UE, for each resource block of each spatial layer. In some examples, the bottleneck band may be identified by determining a sum of a set of resource blocks within each window location of a plurality of window locations along an entire range of resource block indices, each window location associated with a different range of resource block indices. In some such examples, the bottleneck band is associated with a first set of resource blocks within a first window location, such as the window 654 described with reference to FIG. 6B. In such examples, a first value of a first sum of the mutual information associated with each resource block of the first set of resource blocks is less than a second value of a second sum of the mutual information associated with a second set of resource blocks within remaining window locations of the multiple window locations.

At block 1008, the process 1000 transmits, to the base station, a channel state feedback report based on identifying the bottleneck band, the channel state feedback report indicating channel state information (CSI) associated with the estimated wideband channel. In some examples, the CSI is a wideband CSI determined based on one or more features associated with the bottleneck band. Additionally, or alternatively, the channel state feedback report indicates a location of the bottleneck band. Additionally, or alternatively, the CSI is one of multiple CSIs indicated by the channel state feedback report, where each CSI is associated with a respective band, within a bandwidth, that is different from the bottleneck band. At block 1010, the process 1000 receives, from the base station, a transmission grant based on transmitting the channel feedback report. In some examples, the transmission grant excludes a transmission within the bottleneck band. Additionally, or alternatively, the transmission grant indicates one or more of a modulation and coding scheme (MCS), a number of spatial multiplexed layers, or a pre-coding matrix indicator (PMI) for a transmission associated with the transmission grant based on the multiple CSI.

Figure 11:
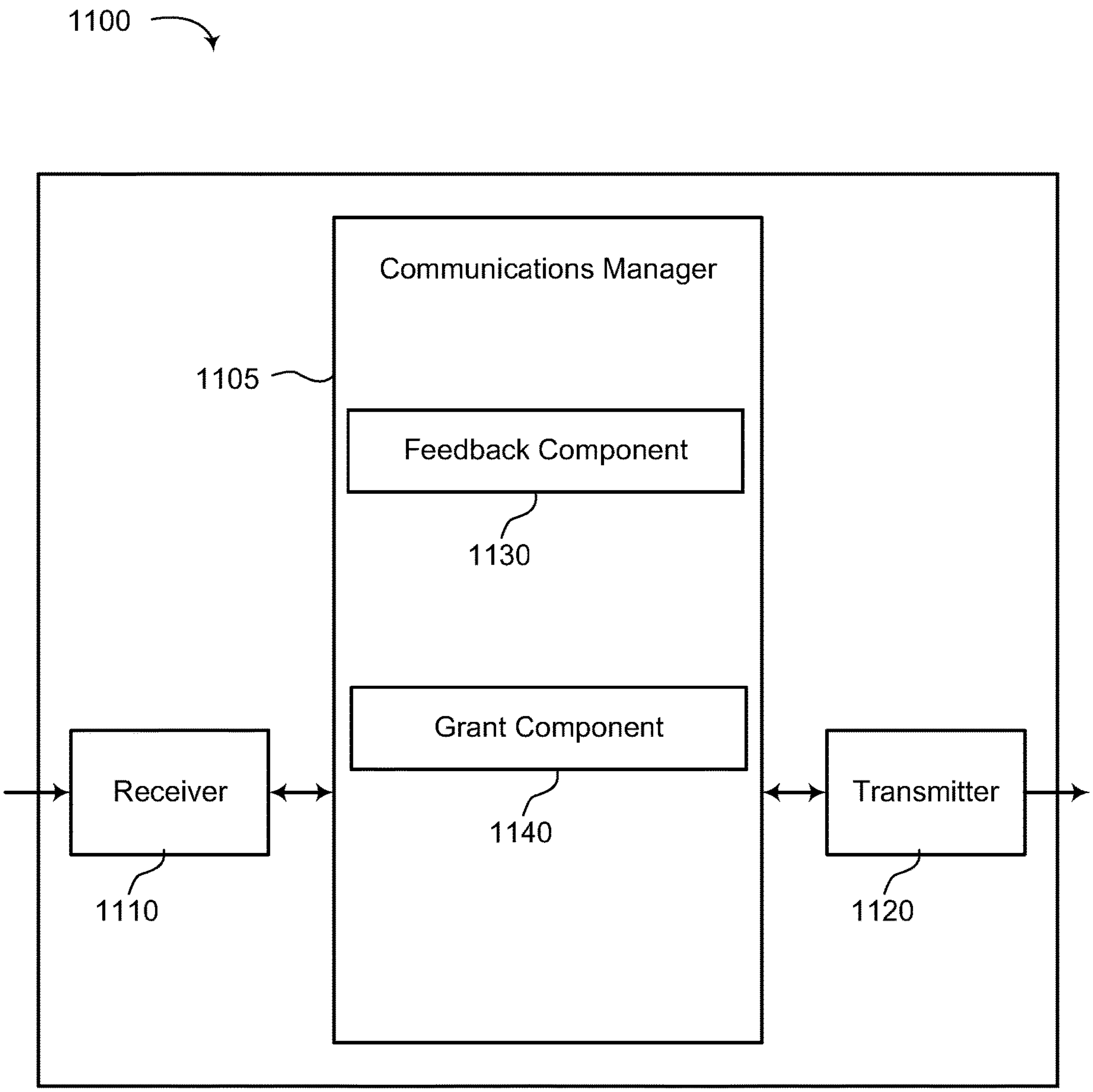
FIG. 11 is a block diagram of a wireless communication device that processes a feedback report based on a BNB identified at a UE, in accordance with aspects of the present disclosure.

FIG. 11 is a block diagram of a wireless communication device 1100 that processes a feedback report at a base station based on a BNB identified at a UE, in accordance with aspects of the present disclosure. The wireless communication device 1100 may be an example of aspects of a base station 110 described with reference to FIGS. 1, 2, and 5. The wireless communication device 1100 may include a receiver 1110, a communications manager 1115, a transmitter 1120, a feedback component 1130, and a grant component 1140, which may be in communication with one another (for example, via one or more buses). In some examples, the wireless communication device 1100 is configured to perform operations, including operations of the process 1000 described below with reference to FIG. 10.

In some examples, the wireless communication device 1100 can include a chip, system on chip (SOC), chipset, package, or device that includes at least one processor and at least one modem (for example, a 5G modem or other cellular modem). In some examples, the communications manager 1115, or its sub-components, may be separate and distinct components. In some examples, at least some components of the communications manager 1115 are implemented at least in part as software stored in a memory. For example, portions of one or more of the components of the communications manager 1115 can be implemented as non-transitory code executable by the processor to perform the functions or operations of the respective component.

The receiver 1110 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110 or a UE 120, described with reference to FIGS. 1 and 2.

The received information may be passed on to other components of the wireless communication device 1100. The receiver 1110 may be an example of aspects of the receive processor 238 described with reference to FIG. 2. The receiver 1110 may include a set of radio frequency (RF) chains that are coupled with or otherwise utilize a set of antennas (for example, the set of antennas may be an example of aspects of the antennas 234*a* through 234*t* described with reference to FIG. 2).

The transmitter 1120 may transmit signals generated by the communications manager 1115 or other components of the wireless communication device 1100. In some examples, the transmitter 1120 may be collocated with the receiver 1110 in a transceiver. The transmitter 1120 may be an example of aspects of the transmit processor 220 described with reference to FIG. 2. The transmitter 1120 may be coupled with or otherwise utilize a set of antennas (for example, the set of antennas may be an example of aspects of the antennas 234*a* through 234*t*), which may be antenna elements shared with the receiver 1110. In some examples, the transmitter 1120 is configured to transmit control information in a physical uplink control channel (PUCCH) and data in a physical uplink shared channel (PUSCH).

The communications manager 1115 may be an example of aspects of the controller/processor 240 described with reference to FIG. 2. The communications manager 1115 includes the feedback component 1130 and the grant component 1140. In some examples, the feedback component 1130 may work in conjunction with the transmitter 1120 to transmit, to a UE, a reference signal on a wideband channel. Working in conjunction with the receiver 1110, the feedback component 1130 may receive, from the UE, a channel state feedback report based on transmitting the reference signal, the channel state feedback report indicating one or more of a location of a bottleneck band associated with the wideband channel, a wideband channel state information (CSI) associated with the bottleneck band, or a single respective CSI for each band, within a bandwidth, that is different than the bottleneck band. The grant component 1140 may work in conjunction with the feedback component 1130 and the transmitter 1120 to transmit, to the UE, a transmission grant based on receiving the channel feedback report.

Figure 12:
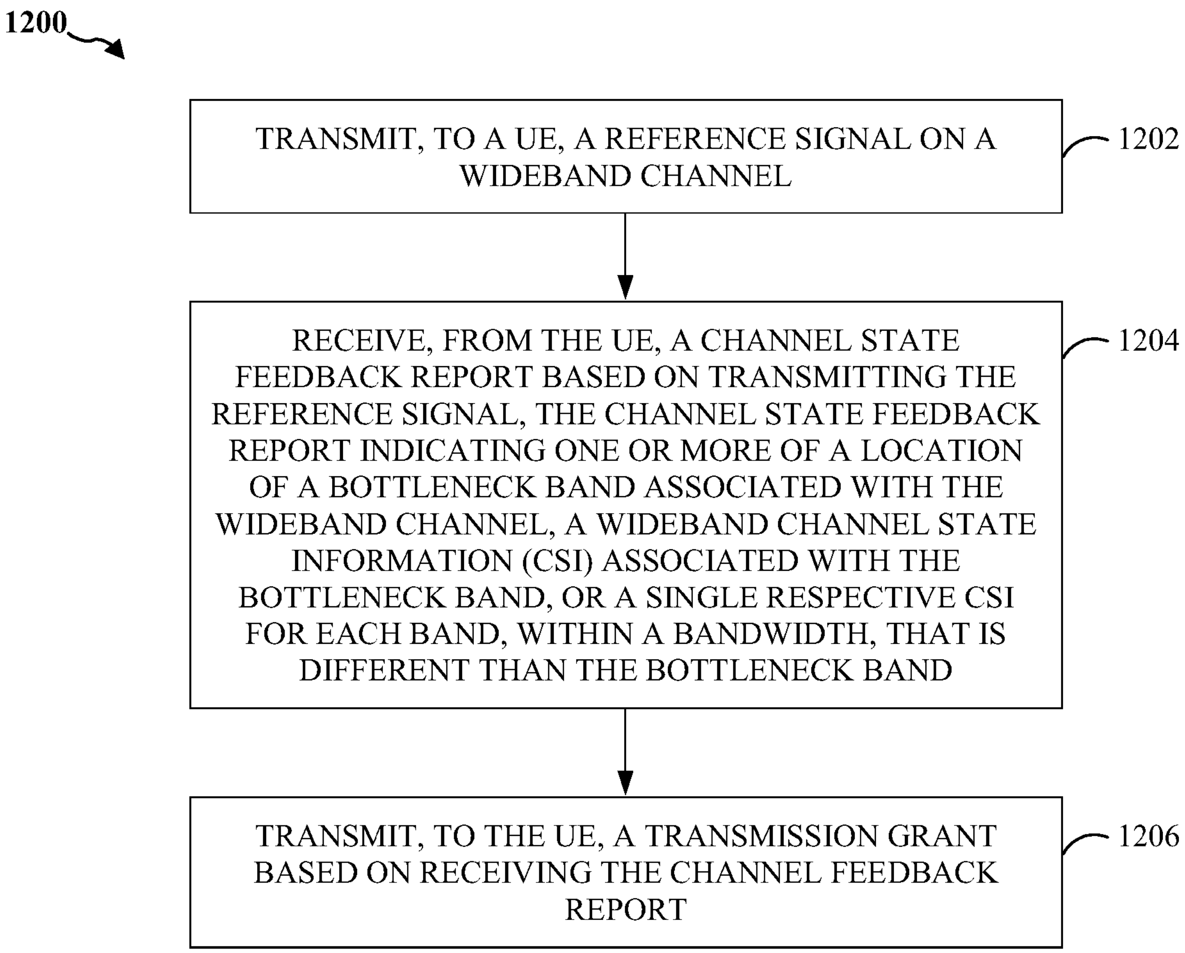
FIG. 12 is a flow diagram illustrating an example process for processing a feedback report at a base station based on a BNB identified at a UE, in accordance with some aspects of the present disclosure.

FIG. 12 is a flow diagram illustrating an example process 1200 for processing a feedback report at a base station based on a BNB identified at a UE, in accordance with some aspects of the present disclosure. The process 1200 may be performed by a base station, such as a base station 110 described with reference to FIGS. 1, 2, and 8.

As shown in FIG. 12, the process 1200 begins at block 1202 by transmitting, to a UE, a reference signal on a wideband channel. At block 1204, the process 1200 receives, from the UE, a channel state feedback report based on transmitting the reference signal, the channel state feedback report indicating one or more of a location of a bottleneck band associated with the wideband channel, a wideband channel state information (CSI) associated with the bottleneck band, or a single respective CSI for each band, within a bandwidth, that is different than the bottleneck band. At block 1206, the process 1200 transmits, to the UE, a transmission grant based on receiving the channel feedback report.

Implementation examples are described in the following numbered clauses:

Clause 1. A method of wireless communication performed by a user equipment (UE), comprising: receiving, from a base station, a reference signal on a wideband channel; estimating, at the UE, the wideband channel based on receiving the reference signal; identifying, at the UE, a bottleneck band of the wideband channel based on a metric associated with the estimated wideband channel; transmitting, to the base station, a channel state feedback report based on identifying the bottleneck band, the channel state feedback report indicating channel state information (CSI) associated with the estimated wideband channel; and receiving, from the base station, a transmission grant based on transmitting the channel feedback report.

Clause 2. The method of Clause 1, in which the metric comprises mutual information between channel bits transmitted by the base station and a log likelihood ratio (LLR), of the UE, for each resource block of each spatial layer.

Clause 3. The method of Clause 2, in which identifying the bottleneck band comprises determining a sum of a set of resource blocks within each window location of a plurality of window locations along an entire range of resource block indices, each window location associated with a different range of resource block indices.

Clause 4. The method of Clause 3, in which the bottleneck band is associated with a first set of resource blocks within a first window location; and a first value of a first sum of the mutual information associated with each resource block of the first set of resource blocks is less than a second value of a second sum of the mutual information associated with a second set of resource blocks within remaining window locations of the plurality of window locations.

Clause 5. The method of any one of Clauses 1-4, further comprising determining wideband CSI based on features associated with the bottleneck band.

Clause 6. The method of Clause 5, in which the CSI is the wideband CSI.

Clause 7. The method of Clauses 1-6, in which the channel state feedback report further indicates a location of the bottleneck band.

Clause 8. The method of Clause 7, in which the transmission grant excludes a transmission within the bottleneck band.

Clause 9. The method of any one of Clauses 1-7, in which the CSI is one of a plurality of CSIs indicated by the channel state feedback report, each CSI of the plurality of CSIs associated with a respective band, within a bandwidth, that is different from the bottleneck band.

Clause 10. The method of Clause 9, in which the transmission grant indicates one or more of a modulation and coding scheme (MCS), a number of spatial multiplexed layers, or a pre-coding matrix indicator (PMI) for a transmission associated with the transmission grant based on the plurality of CSI.

Clause 11. The method of any one of Clauses 1-10, in which the bottleneck band is identified via a machine learning model.

Clause 12. A method of wireless communication performed by a base station, comprising: transmitting, to a user equipment (UE), a reference signal on a wideband channel; receiving, from the UE, a channel state feedback report based on transmitting the reference signal, the channel state feedback report indicating one or more of a location of a bottleneck band associated with the wideband channel, a wideband channel state information (CSI) associated with the bottleneck band, or a single respective CSI for each band, within a bandwidth, that is different than the bottleneck band; and transmitting, to the UE, a transmission grant based on receiving the channel feedback report.

Clause 13. The method of Clause 12, in which: the channel state feedback report further indicates the location of the bottleneck band; and the transmission grant excludes a transmission within the bottleneck band.

Clause 14. The method of any one of Clauses 12-13, in which the transmission grant indicates one or more of a modulation and coding scheme (MCS), a number of spatial multiplexed layers, or a pre-coding matrix indicator (PMI) for a transmission associated with the transmission grant based on the plurality of CSI.

Clause 15. The method of any one of Clauses 12-14, in which: the bottleneck band is associated with a first set of resource blocks within a first window location; and a first value of a first sum of the mutual information associated with each resource block of the first set of resource blocks is less than a second value of a second sum of the mutual information associated with a second set of resource blocks within remaining window locations of the plurality of window locations.

Clause 16. The method of any one of Clauses 12-15, further comprising:

receiving, from the UE, one or more reference signals;

identifying, at the base station, a bottleneck band based on receiving the one or more reference signals; and transmitting, to the UE, another transmission grant based on identifying the bottleneck band.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

As used, "or" is used intended to be interpreted in the inclusive sense, unless otherwise explicitly indicated. For example, "a or b" may include a only, b only, or a combination of a and b. As used, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

What is claimed is:

1. A method of wireless communication by a user equipment (UE), comprising:

receiving, from a base station, a reference signal on a wideband channel;

estimating, at the UE, the wideband channel based on receiving the reference signal;

identifying, at the UE, a bottleneck band of the wideband channel based on a metric associated with the estimated wideband channel wherein the metric comprises mutual information between channel bits transmitted by the base station and a log likelihood ratio (LLR), of the UE, for each resource block of each spatial layer;

transmitting, to the base station, a channel state feedback report based on identifying the bottleneck band, the channel state feedback report indicating channel state information (CSI) associated with the estimated wideband channel; and receiving, from the base station, a transmission grant based on transmitting the channel state feedback report.

2. The method of claim 1, in which identifying the bottleneck band comprises determining a sum of a set of resource blocks within each window location of a plurality of window locations along an entire range of resource block indices, each window location associated with a different range of resource block indices.

3. The method of claim 2, in which the bottleneck band is associated with a first set of resource blocks within a first window location; and a first value of a first sum of the mutual information associated with each resource block of the first set of resource blocks is less than a second value of a second sum of the mutual information associated with a second set of resource blocks within remaining window locations of the plurality of window locations.

4. The method of claim 1, further comprising determining a wideband CSI based on features associated with the bottleneck band.

5. The method of claim 4, in which the CSI is the wideband CSI.

6. The method of claim 1, in which the channel state feedback report further indicates a location of the bottleneck band.

7. The method of claim 6, in which the transmission grant excludes a transmission within the bottleneck band.

8. The method of claim 1, in which the CSI is one of a plurality of CSI indicated by the channel state feedback report, each CSI of the plurality of CSI associated with a respective band, within a bandwidth, that is different from the bottleneck band.

9. The method of claim 8, in which the transmission grant indicates one or more of a modulation and coding scheme (MCS), a number of spatial multiplexed layers, or a precoding matrix indicator (PMI) for a transmission associated with the transmission grant based on the plurality of CSI.

10. A method of wireless communication performed by a base station, comprising:

transmitting, to a user equipment (UE), a reference signal on a wideband channel;

receiving, from the UE, a channel state feedback report based on transmitting the reference signal, the channel state feedback report indicating one or more of a location of a first bottleneck band associated with the wideband channel, a wideband channel state information (CSI) associated with the first bottleneck band, or a single respective CSI for each band, within a bandwidth, that is different than the first bottleneck band, wherein the channel state feedback report further indicates the location of the first bottleneck band; and the first transmission grant excludes a transmission within the first bottleneck band; and transmitting, to the UE, a first transmission grant based on receiving the channel state feedback report.

11. The method of claim 10, in which:

the channel state feedback report indicates the single respective CSI for each band, within the bandwidth, that is different than the first bottleneck band; and the first transmission grant indicates one or more of a modulation and coding scheme (MCS), a number of spatial multiplexed layers, or a pre-coding matrix indicator (PMI) for a transmission associated with the first transmission grant based on the channel state feedback report indicating the single respective CSI for each band.

12. The method of claim 10, in which:

the first bottleneck band is associated with a first set of resource blocks within a first window location; and a first value of a first sum of mutual information associated with each resource block of the first set of resource blocks is less than a second value of a second sum of the mutual information associated with a second set of resource blocks within remaining window locations of a plurality of window locations.

13. The method of claim 10, further comprising:

receiving, from the UE, one or more reference signals;

identifying a second bottleneck band based on receiving the one or more reference signals; and transmitting, to the UE, a second transmission grant based on identifying the second bottleneck band.

14. An apparatus for wireless communications at a user equipment (UE), comprising:

a processor;

a memory coupled with the processor; and instructions stored in the memory and operable, when executed by the processor, to cause the apparatus to:

receive, from a base station, a reference signal on a wideband channel;

estimate the wideband channel based on receiving the reference signal;

identify a bottleneck band of the wideband channel based on a metric associated with the estimated wideband channel wherein the metric comprises mutual information between channel bits transmitted by the base station and a log likelihood ratio (LLR), of the UE, for each resource block of each spatial layer;

transmit, to the base station, a channel state feedback report based on identifying the bottleneck band, the channel state feedback report indicating channel state information (CSI) associated with the estimated wideband channel; and receive, from the base station, a transmission grant based on transmitting the channel state feedback report.

15. The apparatus of claim 14, in which the instructions that cause the apparatus to identify the bottleneck band further cause the apparatus to determine a sum of a set of resource blocks within each window location of a plurality of window locations along an entire range of resource block indices, each window location associated with a different range of resource block indices.

16. The apparatus of claim 15, in which:

the bottleneck band is associated with a first set of resource blocks within a first window location; and a first value of a first sum of the mutual information associated with each resource block of the first set of resource blocks is less than a second value of a second sum of the mutual information associated with a second set of resource blocks within remaining window locations of the plurality of window locations.

17. The apparatus of claim 14, in which execution of the instructions further cause the apparatus to determine wideband CSI based on features associated with the bottleneck band.

18. The apparatus of claim 17, in which the CSI is the wideband CSI.

19. The apparatus of claim 14, in which the channel state feedback report further indicates a location of the bottleneck band.

20. The apparatus of claim 19, in which the transmission grant excludes a transmission within the bottleneck band.

21. The apparatus of claim 14, in which:

the CSI is one of a plurality of CSI indicated by the channel state feedback report; and each CSI of the plurality of CSI associated with a respective band, within a bandwidth, that is different than the bottleneck band.

22. The apparatus of claim 21, in which the transmission grant indicates one or more of a modulation and coding scheme (MCS), a number of spatial multiplexed layers, or a pre-coding matrix indicator (PMI) for a transmission associated with the transmission grant based on the plurality of CSI.

23. An apparatus for wireless communications at a base station, comprising:

a processor;

a memory coupled with the processor; and instructions stored in the memory and operable, when executed by the processor, to cause the apparatus to:

transmitting, to a user equipment (UE), a reference signal on a wideband channel;

receiving, from the UE, a channel state feedback report based on transmitting the reference signal, the channel state feedback report indicating one or more of a location of a first bottleneck band associated with the wideband channel, a wideband channel state information (CSI) associated with the first bottleneck band, or a single respective CSI for each band, within a bandwidth, that is different than the first bottleneck band wherein the channel state feedback report indicates the location of the first bottleneck band; and transmitting, to the UE, a first transmission grant based on receiving the channel state feedback report wherein the first transmission grant excludes a transmission within the first bottleneck band.

24. The apparatus of claim 23, in which:

the channel state feedback report indicates the single respective CSI for each band, within the bandwidth, that is different than the first bottleneck band; and the first transmission grant indicates one or more of a modulation and coding scheme (MCS), a number of spatial multiplexed layers, or a pre-coding matrix indicator (PMI) for a transmission associated with the first transmission grant based on the channel state feedback report indicating the single respective CSI for each band.

25. The apparatus of claim 23, in which:

the first bottleneck band is associated with a first set of resource blocks within a first window location; and a first value of a first sum of mutual information associated with each resource block of the first set of resource blocks is less than a second value of a second sum of the mutual information associated with a second set of resource blocks within remaining window locations of a plurality of window locations.

26. The apparatus of claim 23, in which execution of the instructions further cause the apparatus to:

receive, from the UE, one or more reference signals;

identify a second bottleneck band based on receiving the one or more reference signals; and transmit, to the UE, a second transmission grant based on identifying the second bottleneck band.

* * * * *